United States Patent
Lee et al.

(10) Patent No.: US 10,278,125 B2
(45) Date of Patent: Apr. 30, 2019

(54) APPARATUS AND METHOD FOR MANAGING CONNECTION IN WIRELESS COMMUNICATION SYSTEM

(71) Applicant: Samsung Electronics Co., Ltd., Suwon-si, Gyeonggi-do (KR)

(72) Inventors: Ok-Seon Lee, Suwon-si (KR); Kang-Jin Yoon, Seoul (KR); Hyeon-Jin Kang, Seoul (KR); Yong-Seok Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 14/697,159

(22) Filed: Apr. 27, 2015

(65) Prior Publication Data
US 2015/0312852 A1 Oct. 29, 2015

(30) Foreign Application Priority Data
Apr. 28, 2014 (KR) .................. 10-2014-0050903

(51) Int. Cl.
*H04W 48/20* (2009.01)
*H04W 84/12* (2009.01)
*H04W 48/16* (2009.01)

(52) U.S. Cl.
CPC ........... *H04W 48/20* (2013.01); *H04W 84/12* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 2009/0131056 A1* | 5/2009 | Bontu | H04W 36/0072 455/436 |
| 2013/0150023 A1* | 6/2013 | Kim | H04W 36/32 455/423 |
| 2013/0235861 A1 | 9/2013 | Balasubramanian et al. | |
| 2014/0099955 A1* | 4/2014 | Nukala | H04W 36/00 455/436 |
| 2015/0257052 A1* | 9/2015 | Schliwa-Bertling | H04W 36/0066 455/435.2 |
| 2015/0373772 A1* | 12/2015 | Watanabe | H04W 76/19 455/436 |

* cited by examiner

*Primary Examiner* — Chi H Pham
*Assistant Examiner* — Raul Rivas
(74) *Attorney, Agent, or Firm* — Jefferson IP Law, LLP

(57) ABSTRACT

An apparatus for connecting to a wireless communication system is provided. The apparatus includes a controller configured to, when it is determined to restrict a connection to a base station, set base stations which are detected during a first reference time as connection candidate base stations, set any base station which fails to be detected during a second reference time as one or more base stations to be excluded from connection, and select at least one base station except for the one or more base stations to be excluded from connection from among the connection candidate base stations, and a transmitter configured to transmit a connection request signal to the selected base station.

24 Claims, 9 Drawing Sheets

APPARATUS AND METHOD FOR MANAGING CONNECTION IN WIRELESS COMMUNICATION SYSTEM

CROSS-REFERENCE TO RELATED APPLICATION(S)

This application claims the benefit under 35 U.S.C. § 119(a) of a Korean patent application filed on Apr. 28, 2014 in the Korean Intellectual Property Office and assigned Serial number 10-2014-0050903, the entire disclosure of which is hereby incorporated by reference.

TECHNICAL FIELD

The present disclosure relates to an apparatus and method for determining a target base station to select or reselect a base station when a terminal connects to a base station in a wireless communication system.

BACKGROUND

In comparison with an existing wired Local Area Network (LAN), which communicates by connecting a cable, a wireless LAN provides connection using a radio frequency. The wireless LAN may be configured by an Access Point (AP) which provides a wireless connection. A base station establishes a single wireless LAN by setting a frequency band, a Service Set IDentifier (SSID), a securing method, and the like. The base station has the same wireless LAN name as the set SSID and informs neighboring terminals of its own information including the SSID by periodically transmitting signals of a pre-defined format. The terminal searches neighboring base stations through a scanning procedure to connect to a specific wireless LAN. The terminal may select a single base station according to the result of the searching and then connect to the base station.

In recent years, wireless mobile communication service providers install wireless base stations in buses or subway trains to prevent overload of data communication. As the number of wireless LAN mobile base stations attached to the buses or subway trains increases, users encounter frequent connection or disconnection to or from the base stations in an environment where many wireless LAN mobile base stations are installed, such as bus stops, when they use a related-art connection management method for a fixed wireless LAN mobile base station. This may result in signal overhead and network overhead due to increased disconnection time, connection cancellation, and reconnection.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for an apparatus to manage connection to a mobile base station.

Another aspect of the present disclosure is to provide an apparatus and method for enabling an apparatus to connect to neighboring base stations other than a base station which repeats appearing and disappearing.

Another aspect of the present disclosure is to provide an apparatus and method for setting a base station to be excluded from connection as a base station to be connected again.

Another aspect of the present disclosure is to provide an apparatus and method for searching mobility of an apparatus and enabling the apparatus to connect to neighboring base stations other than a base station which repeats appearing and disappearing in a new location.

In accordance with an aspect of the present disclosure, an apparatus for connecting to a wireless communication system is provided. The apparatus includes a controller configured to, when it is determined to restrict a connection to a base station, set base stations which are detected during a first reference time as connection candidate base stations, set any base station which fails to be detected during a second reference time as one or more base stations to be excluded from connection, and select at least one base station except for the one or more base stations to be excluded from connection from among the connection candidate base stations, and a transmitter configured to transmit a connection request signal to the selected base station.

In accordance with another aspect of the present disclosure, a method of an apparatus for connecting to a wireless communication system is provided. The method includes determining, by the apparatus, whether to restrict a connection to a base station, setting base stations which are detected during a first reference time as connection candidate base stations, and setting any base station which fails to be detected during a second reference time as one or more base stations to be excluded from connection, selecting at least one base station except for the one or more base stations to be excluded from connection from among the connection candidate base stations, and transmitting a connection request signal to the selected base station.

According to an embodiment of the present disclosure, a method for stably connecting, which can reduce a connection canceling ratio and a disconnection time of a user situated in an environment in which many wireless mobile base stations are installed is provided.

According to an embodiment of the present disclosure, signal overhead and network overhead caused by connection cancellation and reconnection can be reduced.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions or configurations may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, technology for managing a mobile base station according to the present disclosure will be explained. In the following description, a base station includes an Access Point (AP) which provides wireless connection to a terminal in a wireless Local Area Network (LAN), as well as a base station in a cellular network.

Figure 1:
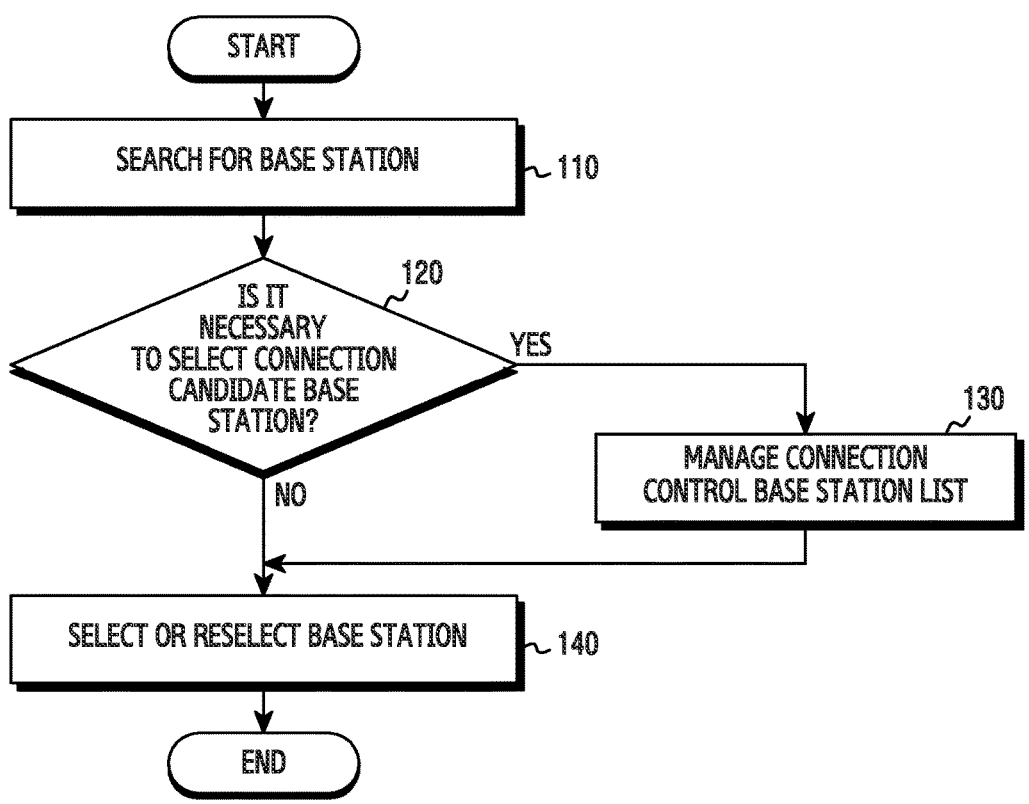
FIG. 1 illustrates a view showing a process for registering a base station to be excluded from connection according to an embodiment of the present disclosure.

FIG. 1 illustrates a view showing a process for registering a base station to be excluded from connection according to an embodiment of the present disclosure.

Referring to FIG. 1, in operation 110, a terminal searches for a base station. The terminal may search for the base station using a Received Signal Strength Indicator (RSSI) value or a load of a corresponding base station carried in a beacon. Alternatively, the terminal may search for the base station using a synchronization signal transmitted from the base station. The terminal stores information on neighboring base stations which are detected in every searching period.

In operation 120, the terminal determines whether to select a connection candidate base station. For example, when a connection canceling ratio or a disconnection time is greater than or equal to a threshold value during a predetermined time, when the terminal recognizes that it is situated in a region where a mobile base station appears or disappears, such as a bus stop or a subway station, through a location recognition system, or when the terminal recognizes a neighboring mobile base station based on mobility information broadcasted by the base station, the terminal proceeds to operation 130 to manage a connection control base station list. When the connection candidate base station is not to be selected, the terminal proceeds to operation 140 to select or reselect a base station and connect to the base station. When the connection candidate base station is to be selected, the terminal manages the connection control base station in operation 130.

In operation 130, the terminal manages the connection control base station list. The terminal determines whether there is a base station which has been observed within an initial base station observing time, but has not been detected within a base station appearing/disappearing determination reference time. When a specific base station has been observed within the initial base station observing time but has not been observed within the base station appearing/disappearing determination reference time, the terminal determines the base station as a base station which repeats appearing and disappearing. The terminal stores the base station as a base station to be excluded from connection. When the base station is observed within a base station connection stability determination reference time even if the base station is the base station to be excluded from connection, the terminal may add the base station to the base station which can be connected.

In operation 140, the terminal may select a new base station or reselect an existing base station, except for the base station to be excluded from connection from among the neighboring base stations, and connect to the selected or reselected base station. The base station may be selected in various methods. For example, a base station having the highest RSSI value may be selected, a base station having the lowest load may be selected, or a base station which is detected for the longest time with reference to a searching time may be selected. In addition, the process of selecting or reselecting the base station and connecting to the base station may include transmitting, by the terminal, a connection request signal to the base station, receiving a connection response signal from the base station, and then connecting to the base station.

Figure 2:
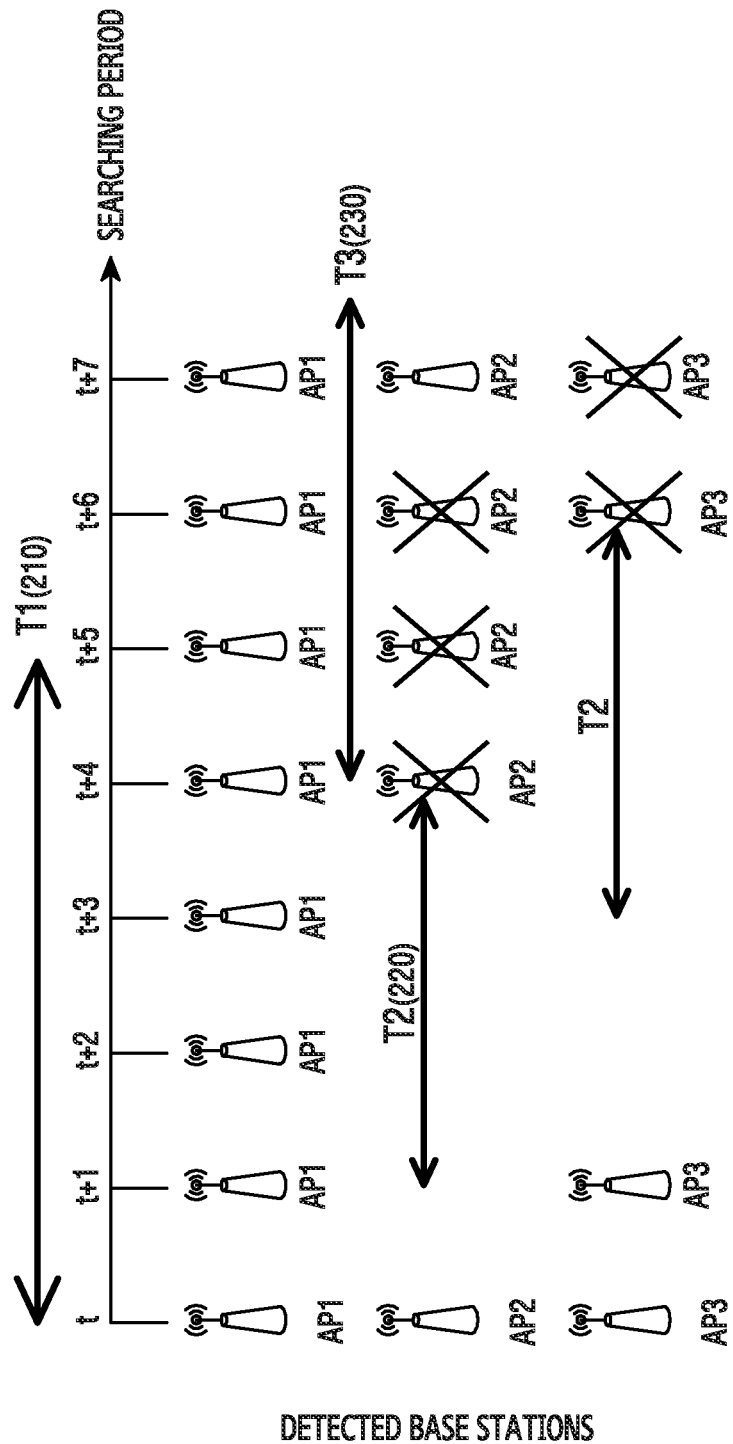
FIG. 2 illustrates a view showing an example of selecting a base station to be excluded from connection according to an embodiment of the present disclosure.

FIG. 2 illustrates a view showing an example of selecting a base station to be excluded from connection according to an embodiment of the present disclosure.

Referring to FIG. 2, T1 210 indicates an initial base station observing time. The terminal stores information on neighboring base stations which are detected during a given initial base station observing time. T2 220 indicates a base station appearing/disappearing determination reference time. The terminal determines a base station to be excluded from connection using the initial base station observing time 210 and the base station appearing/disappearing determination reference time 220. Specifically, when a specific base station has been observed within the initial base station observing time 210, but has not been observed for a predetermined time within the base station appearing/disappearing determination reference time, the terminal adds the specific base station to the base station to be excluded from connection. T3 230 indicates a base station connection stability determination reference time. When, from among the base stations which have not been detected during the base station appearing/disappearing determination reference time and thus are added to the base station to be excluded from connection, a base station is detected during the base station connection stability determination reference time, the terminal releases the detected base station from the base station to be excluded from connection.

The initial base station observing time 210, the base station appearing/disappearing determination reference time 220, and the base station connection stability determination reference time 230 may use fixed values or may be arbitrarily set by the user. The base station appearing/disappearing determination reference time 220 and the base station connection stability determination reference time 230 may be set by considering a change in the RSSI caused by a moving pattern of a mobile base station of a bus, a subway train, or other transportation means. For example, the base station appearing/disappearing determination time and the connection stability determination reference time may be set by considering the pattern of an RSSI signal of a bus which stops at a bus stop and then leaves rapidly, a bus which stops at a bus stop and then leaves slowly, and a bus which stops and leaves, but stops to wait for a light change and leaves again.

Figure 3:
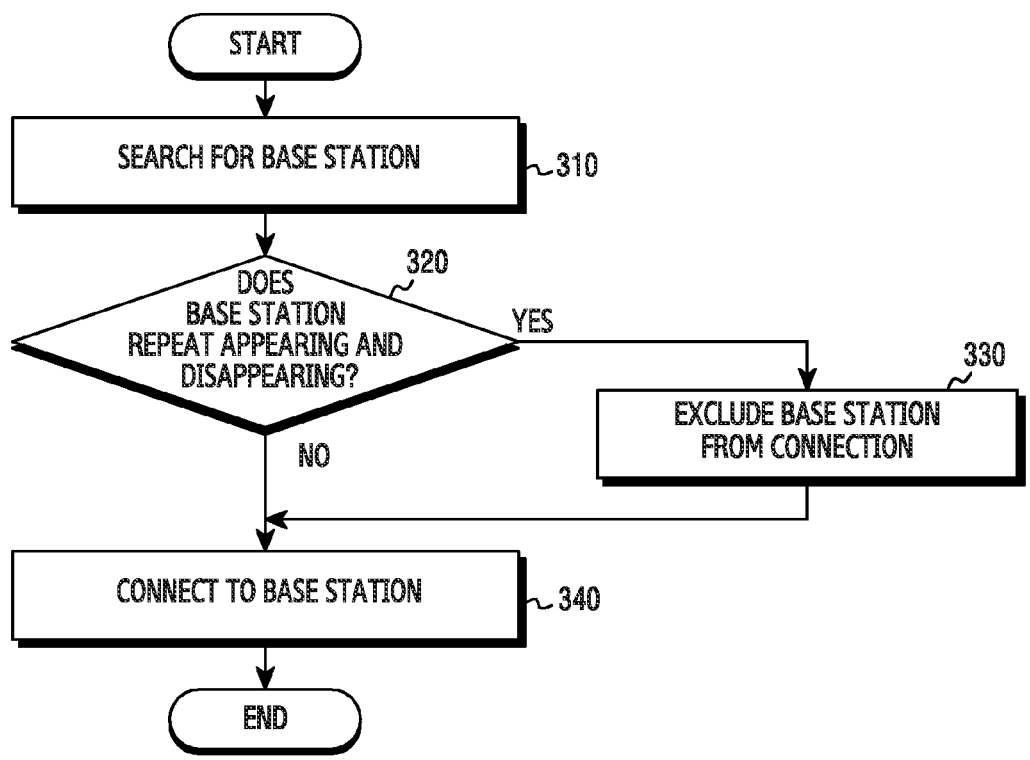
FIG. 3 illustrates a view showing an operation procedure for selecting a base station to be excluded from connection according to an embodiment of the present disclosure.

FIG. 3 illustrates a view showing an operation procedure for selecting a base station to be excluded from connection according to an embodiment of the present disclosure.

Referring to FIG. 3, in operation 310, the terminal searches for neighboring base stations and stores information on the neighboring base stations. The terminal searches for the base stations using RSSI values of the base stations or loads of the base stations carried in beacons, and selects a specific base station from the neighboring base stations. The terminal may select the specific base station in various methods. For example, the terminal may select a base station having the highest RSSI value, select a base station having the lowest load, or select a base station which is detected for the longest time.

In operation 320, the terminal determines whether the selected specific base station repeats appearing and disappearing. When the specific base station has been detected during the initial base station observing time but has not been detected during the base station appearing/disappearing determination reference time, the terminal may determine the specific base station as a base station repeating appearing and disappearing and proceed to operation 330. In operation 330, the terminal excludes the specific base station from being connected and proceeds to operation 340. When the terminal determines that the specific base station is not a base station repeating appearing and disappearing, the terminal proceeds to operation 340.

In operation 340, the terminal may select or reselect a base station except for the base station which is determined as repeating appearing and disappearing from among the neighboring base stations, and connect to the selected or reselected base station. The terminal may select the specific base station by selecting a base station having the highest RSSI value, selecting a base station having the lowest load, or selecting a base station which is detected for the longest time.

Figure 4:
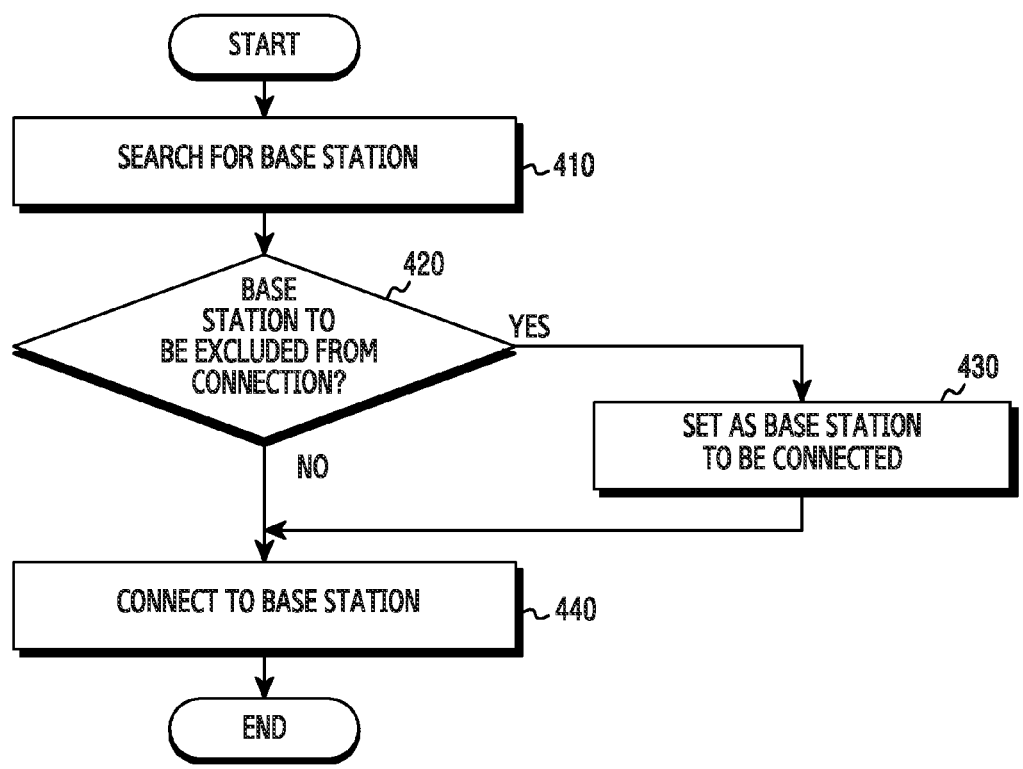
FIG. 4 illustrates a view showing an operation procedure for releasing a base station from a base station to be excluded from connection according to an embodiment of the present disclosure.

FIG. 4 illustrates a view showing an operation procedure for releasing a base station from a base station to be excluded from connection according to an embodiment of the present disclosure.

Referring to FIG. 4, in operation 410, the terminal searches for neighboring base stations and stores information on the neighboring base stations. The terminal may search for the base stations using RSSI values of the base stations or loads of the base stations carried in beacons, and then, select a specific base station from the neighboring base stations. The terminal may select the specific base station by selecting a base station having the highest RSSI value, selecting a base station having the lowest load, or selecting a base station which is detected for the longest time.

In operation 420, the terminal may determine whether the selected specific base station is a base station to be excluded from connection. When the selected specific base station is the base station to be excluded from connection, the terminal may prepare for a possible change of the specific base station to a base station which does not repeat appearing and disappearing and can constantly be connected. The terminal may determine whether the specific base station repeats appearing and disappearing or not to release the specific base station from the base station to be excluded from connection.

In operation 430, the terminal may set the base station to be excluded from connection as a base station to be connected. The terminal searches the specific base station during the base station connection stability determination reference time, and, when the specific base station has not been detected during the base station appearing/disappearing determination reference time but has been detected during the base station connection stability determination reference time, the terminal may release the specific base station from the base station to be excluded from connection.

In operation 440, the terminal may select or reselect a base station except for the base station determined as repeating appearing and disappearing from among the neighboring base stations, and may connect to the selected or reselected base station. The terminal may select the specific base station by selecting a base station having the highest RSSI value, selecting a base station having the lowest load, or selecting a base station which is detected for the longest time.

Figure 5:
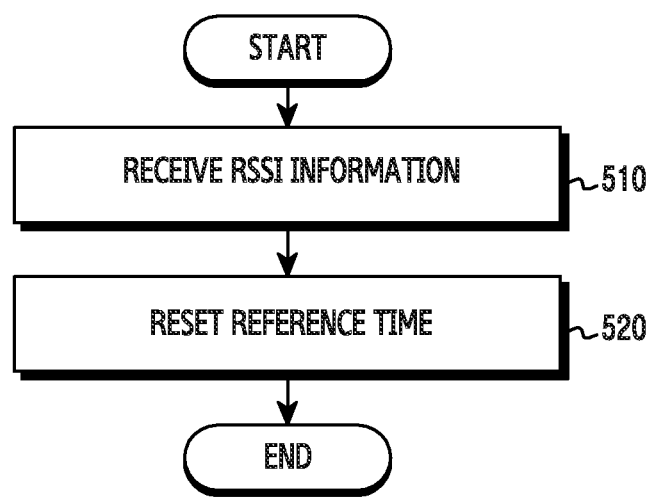
FIG. 5 illustrates a view showing an operation for setting a reference time of a terminal according to an embodiment of the present disclosure.

FIG. 5 illustrates a view showing an operation of setting a reference time of a terminal according to an embodiment of the present disclosure.

Referring to FIG. 5, in operation 510, the terminal receives RSSI information from a service provider. The RSSI information refers to strength of a signal from a base station. The RSSI information refers to an RSSI pattern which is a result of analyzing a pattern of a mobile base station by the service provider. For example, the terminal may receive, from the service provider, information such as the pattern of an RSSI signal from a bus which stops at a bus stop and then leaves rapidly, a bus which stops and then leaves slowly, or a bus which stops and leaves, but stops to wait for a light change and then leaves again.

In operation 520, the terminal may set a reference value using the received RSSI value. For example, the terminal may re-set the base station appearing/disappearing determination reference time to set the base station to be excluded from connection, and the connection stability determination reference time to release a base station from the base station to be excluded from connection. Specifically, the terminal may set the reference time again using an average of the received RSSI patterns or a maximum value or a minimum value of the RSSI values. The received RSSI value may include information on strength of a signal according to a moving pattern of a moving base station. The information on the strength of the signal may be used as a reference for the terminal to set a specific base station as the base station to be excluded from connection or release from the base station to be excluded from connection. For example, when a specific RSSI pattern is detected at a specific time, the terminal may determine that the time at which the RSSI pattern is detected is a time at which a mobile base station appears. Therefore, the terminal may set the base station appearing/disappearing determination reference time based on the time at which the RSSI pattern is detected and compare the initial base station observing time and the set base station appearing/disappearing determination reference time. The terminal may determine a base station which has been detected during the initial base station observing time, but has not been detected during the base station appearing/disappearing determination reference time, as a mobile base station temporarily appearing at a specific time. The terminal may set the mobile base station temporarily appearing at the specific time as a base station to be excluded from connection, and then may try to connect to only the other base stations except for the base station to be excluded from connection.

Figure 6:
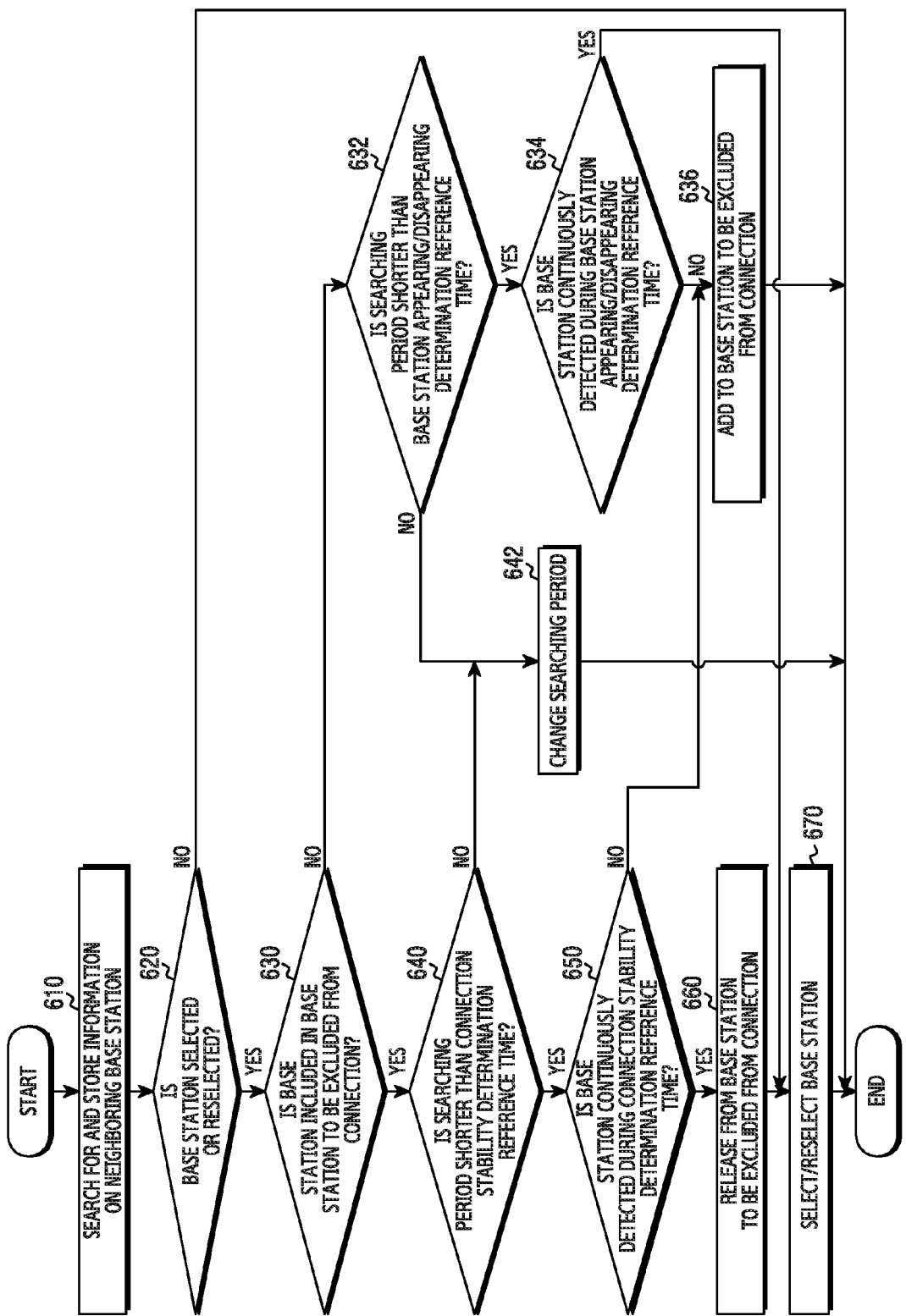
FIG. 6 illustrates a view showing an operation procedure for selecting or reselecting a base station based on a base station to be excluded from connection according to an embodiment of the present disclosure.

FIG. 6 illustrates a view showing an operation procedure for selecting or reselecting a base station based on a base station to be excluded from connection according to an embodiment of the present disclosure.

Referring to FIG. 6, in operation 610, the terminal searches for neighboring base stations and stores information on the neighboring base stations. The terminal searches for the base stations using RSSI values which are acquired when connecting to wireless base stations or loads of base stations carried in beacons, and then stores information on the base stations. For example, when the user is situated at a bus stop or a subway platform, the terminal may store information on base station of a moving bus or subway train or other neighboring base stations.

In operation 620, the terminal selects or reselects a specific base station. When the specific base station is selected or reselected, the terminal proceeds to operation 630 to determine whether the specific base station is a base station to be excluded from connection or not.

In operation 630, the terminal determines whether the specific base station is a base station to be excluded from connection or not. The base station to be excluded from connection may be a base station which repeats appearing and disappearing but cannot be connected during a predetermined time, and thus repeats connection and disconnection when the user connects thereto, so that connecting to the base station may result in any inconvenience. For example, when a user who is situated at a bus stop or a subway platform connects to a wireless LAN via a fixed base station, a bus or subway train passing by the user may be detected for a short time and then disappear. From the perspective of the user, when the terminal connects to the bus or subway train passing by, the terminal connects to the bus or subway train for a short time and disconnects therefrom. Therefore, connecting to the bus or subway train passing by may cause inconvenience to the user.

When the base station is not the base station to be excluded from connection, the terminal may proceed to operation 632 to determine whether to add the base station to the base station to be excluded from connection. When the base station is included in the base station to be excluded from connection, the terminal may proceed to operation 640 to determine whether to release the base station from the base station to be excluded from connection.

In operation 632, the terminal determines whether the corresponding base station has been detected during the base station appearing/disappearing determination reference time, and, when the base station appearing/disappearing determination reference time elapses, the terminal proceeds to operation 642 to determine for other base stations.

In operation 634, the terminal may determine whether to add the corresponding base station to the base station to be excluded from connection. The terminal determines whether the corresponding base station has been detected during the initial base station observing time but has not been detected during the base station appearing/disappearing determination reference time. When the base station has been detected during the initial base station observing time but has not been detected during the base station appearing/disappearing determination reference time, the terminal determines that the base station is a base station which temporarily appears, and then proceeds to operation 636 to add the base station to the base station to be excluded from connection. When the specific base station has been detected during the initial base station observing time and has been detected during the base station appearing/disappearing determination reference time, the terminal determines that the corresponding base station is a base station which can be constantly connected, includes the specific base station, and proceeds to operation 670 to select one of the base stations which are not included in the base station to be excluded from connection.

In operation 640, when the specific base station is the base station to be excluded from connection, the terminal compares a searching period and the base station appearing/disappearing determination reference time. When the searching period is longer than the base station appearing/disappearing determination reference time, the terminal proceeds to operation 642 to change the searching period. When the searching period is not longer than the base station appearing/disappearing determination reference time, the terminal proceeds to the operation of determining whether to release the specific base station from the base station to be excluded from connection.

In operation 642, the terminal changes the searching period. The purpose of changing the searching period is to prepare for a case in which the set connection stability determination reference time is so long that there is no base station satisfying a selecting or reselecting condition.

In operation 650, the terminal determines whether to release the specific base station from the base station to be excluded from connection. When the specific base station is detected during the connection stability determination reference time and is detected during the connection stability determination reference time, the terminal proceeds to operation 660 to release the specific base station from the base station to be excluded from connection. When the specific base station is detected during the connection stability determination reference time but is not detected during the connection stability determination reference time, the terminal proceeds to operation 636 to make the specific base station remain in the base station to be excluded from connection.

In operation 670, the terminal selects or reselects a base station. The terminal selects or reselects a base station except for the base station to be excluded from connection from among the neighboring base stations.

Figure 7:
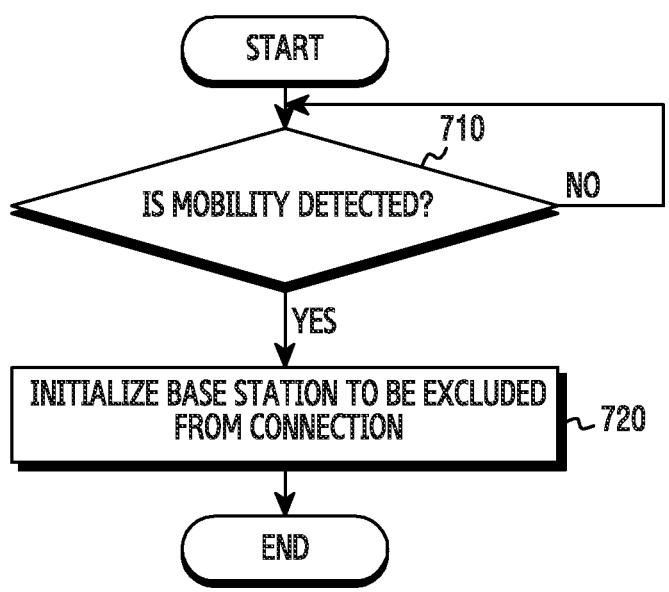
FIG. 7 illustrates a view showing an operation procedure for a terminal to connect to a wireless communication system when mobility of the terminal is detected according to an embodiment of the present disclosure.

FIG. 7 illustrates a view showing an operation procedure for a terminal to connect to a wireless communication system when mobility of the terminal is detected according to an embodiment of the present disclosure.

Referring to FIG. 7, in operation 710, the terminal detects mobility. When the location of the terminal is changed, the environment of neighboring base stations of the terminal may be changed. Therefore, when mobility is detected, the terminal proceeds to operation 720 to set the information on the neighboring base stations again.

In operation 720, the terminal initializes the base station to be excluded from connection. When the mobility of the terminal is detected and the terminal is beyond a set allowable movement reference, the terminal initializes the information on the neighboring base stations to re-set the information on the neighboring base station. Thereafter, the terminal starts to search information on neighboring base stations and sets a base station to be excluded from connection.

Figure 8:
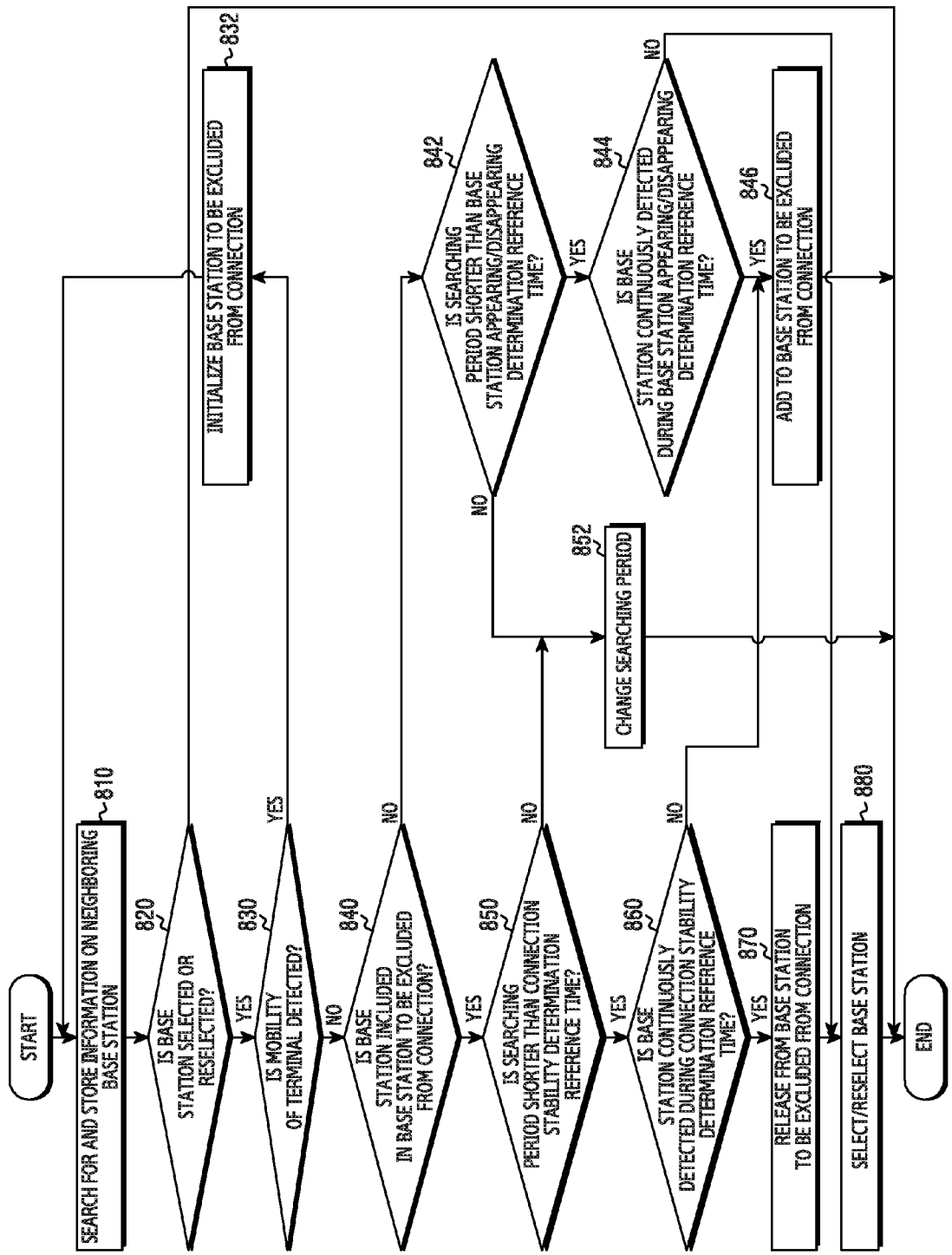
FIG. 8 illustrates a view showing an operation procedure for selecting or reselecting a base station to be excluded from connection when mobility of a terminal is detected according to an embodiment of the present disclosure.

FIG. 8 illustrates a view showing an operation procedure for selecting or reselecting a base station to be excluded from connection when mobility of a terminal is detected according to an embodiment of the present disclosure.

Referring to FIG. 8, in operation 810, the terminal searches for neighboring base stations and stores information on the neighboring base stations. The terminal searches for the base stations using RSSI values which are acquired when connecting to wireless base stations or loads of corresponding base stations carried in beacons, and then stores information on the detected base stations.

In operation 820, the terminal determines whether a base station is selected or reselected. When a certain base station is selected or reselected, the terminal proceeds to operation 830 to detect mobility of the terminal.

In operation 830, the terminal detects mobility. When the terminal moves to another location from a current location, the environments of the neighboring base stations may be changed. For example, when the user rides on a bus or a subway train, the environments of the neighboring base stations may be changed. When the user boards a transportation means and moves, the terminal may be affected by neighboring mobile base stations. When the mobility is detected, the base station to be excluded from connection should also be changed. Therefore, when the mobility is detected, the terminal proceeds to operation 832 to initialize the information on the base station to be excluded from connection.

In operation 840, the terminal determines whether the base station is a base station to be excluded from connection. The base station to be excluded from connection includes a base station which repeats connection and disconnection when the user connects thereto and thus may cause inconvenience when the terminal connects thereto. When the base station is not included in the base station to be excluded from connection, the terminal proceeds to operation 842 to determine whether to add the base station to the base station to be excluded from connection, and, when the base station is included in the base station to be excluded from connection, the terminal proceeds to operation 850 to determine whether to release the base station from the base station to be excluded from connection.

In operation 82, when the specific base station is the base station to be excluded from connection, the terminal compares a searching period and the base station appearing/disappearing determination reference time. When the searching period is longer than the base station appearing/disappearing determination reference time, the terminal proceeds to operation 852 to change the searching period. When the searching period is not longer than the base station appearing/disappearing determination reference time, the terminal proceeds to operation 860 to determine whether to release the specific base station from the base station to be excluded from connection.

In operation 852, the terminal changes the searching period. The purpose of changing the searching period is to prepare for a case in which the set connection stability determination reference time is so long that there is no base station satisfying a selecting or reselecting condition.

In operation 844, the terminal may determine whether to add the corresponding base station to the base station to be excluded from the connection. The terminal determines whether the corresponding base station has been detected during the initial base station observing time but has not been detected during the base station appearing/disappearing determination reference time. When the base station has been detected during the initial base station observing time but has not been detected during the base station appearing/disappearing determination reference time, the terminal determines that the base station is a base station which temporarily appears and then proceeds to operation 846 to add the base station to the base station to be excluded from connection. When the specific base station has been detected during the initial base station observing time and has been detected during the base station appearing/disappearing determination reference time, the terminal determines that the specific base station is a base station which can be constantly connected, includes the specific base station, and proceeds to operation 880 to select one of the base stations which are not included the base station to be excluded from connection.

In operation 850, when the corresponding base station is included in the base station to be excluded from connection, the terminal determines whether the corresponding base station is detected for the connection stability determination reference time. In operation 850, when the searching period exceeds the connection stability determination reference time, the terminal proceeds to operation 852 to determine for another base station. In operation 852, the terminal determines whether another base station satisfies a selecting or reselecting condition, and, when there is no base station satisfying the selecting or reselecting condition, the terminal changes the searching period. The purpose of changing the searching period is to prepare for a case in which the set connection stability determination reference time is so long that there is no base station satisfying the selecting or reselecting condition.

In operation 860, the terminal determines whether to release the corresponding base station from the base station to be excluded from connection. When the corresponding base station is detected during the connection stability determination reference time and is detected during the connection stability determination reference time, the terminal proceeds to operation 870 to release the specific base station from the base station to be excluded from connection. When the specific base station is detected during the connection stability determination reference time but is not detected during the connection stability determination reference time, the terminal proceeds to operation 846 to make the specific base station remain in the base station to be excluded from connection.

In operation 880, the terminal selects or reselects a base station and connects to the base station. The terminal selects or reselects a base station except for the base station to be excluded from connection from among the neighboring base stations.

Figure 9:
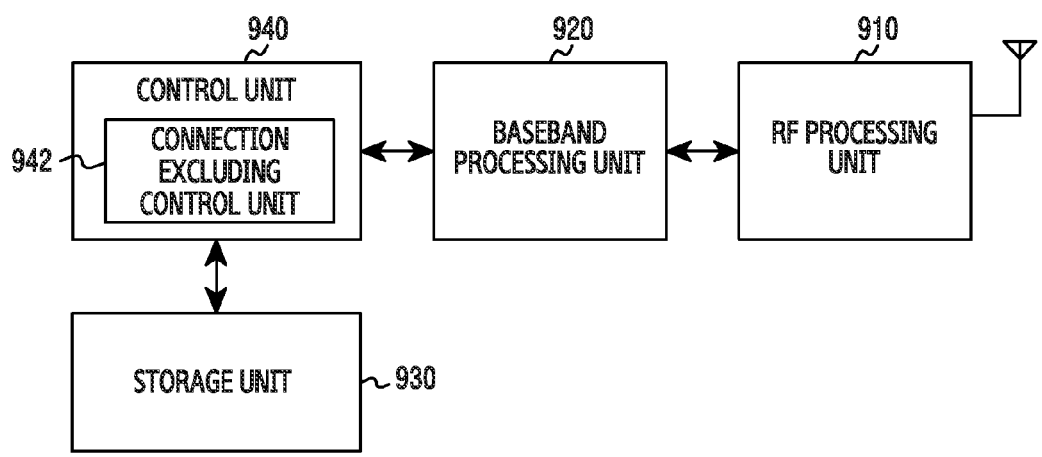
FIG. 9 illustrates a block diagram showing an apparatus for managing a mobile base station in a terminal according to an embodiment of the present disclosure.

FIG. 9 illustrates a block diagram showing an apparatus for managing a mobile base station in a terminal according to an embodiment of the present disclosure.

Referring to FIG. 9, the apparatus includes a Radio Frequency (RF) processing unit 910, a base station searching unit 912, a base band processing unit 920, a storage unit 930, a control unit 940, and a connection excluding control unit 942.

The RF processing unit 910 performs a function for transmitting and receiving signals via a wireless channel, such as signal band conversion, amplification, and the like. That is, the RF processing unit 910 up-converts a baseband signal provided from the baseband processing unit 920 into an RF band signal, transmits the RF band signal via an antenna, and down-converts an RF band signal received via the antenna into a baseband signal. For example, the RF processing unit 910 may include a transmission filter, a reception filter, an amplifier, a mixer, an oscillator, a Digital to Analogue Converter (DAC), an Analogue to Digital Converter (ADC), and the like. Referring to FIG. 9, a single antenna is illustrated but the transmitting end may include a plurality of antennas. In addition, the RF processing unit 910 includes the base station searching unit 912. The terminal may search base stations through the base station searching unit 912.

The baseband processing unit 920 may convert between a baseband signal and a bit string according to a physical layer standard of a system. For example, when transmitting data, the baseband processing unit 920 generates complex symbols by encoding and modulating transmission bit strings. In addition, when receiving data, the baseband processing unit 920 may restore reception bit strings by demodulating and decoding baseband signals provided from the RF processing unit 910. For example, according to the Orthogonal Frequency Division Multiplexing (OFDM) method, when transmitting data, the baseband processing unit 920 generates the complex symbols by encoding and modulating the transmission bit strings, maps the complex symbols onto sub carriers, and then configures OFDM symbols by performing an Inverse Fast Fourier Transform (IFFT) operation and inserting a cyclic prefix (CP). In addition, when receiving data, the baseband processing unit 920 divides the baseband signal provided from the RF processing unit 910 on an OFDM symbol basis, restores the signals which have been mapped onto sub carriers through the FFT operation, and then restores reception bit strings by demodulating and decoding. The baseband processing unit 920 and the RF processing unit 910 may transmit and receive the signals as described above. Accordingly, the baseband processing unit 920 and the RF processing unit 910 may be referred to as a transmitting unit, a receiving unit, a transmitting and receiving unit, or a communication unit.

The storage unit 930 stores data such as basic programs, application programs, and setting information for operations of an apparatus for controlling a transfer rate. In particular, the storage unit 930 may store information of neighboring base stations of a terminal and information related to a base station to be excluded from connection. In addition, the storage unit 930 may provide stored data according to a request of the control unit 940.

The control unit 940 controls the overall operation of the apparatus for managing connection to the mobile base station. For example, the control unit 940 transmits signals via the baseband processing unit 920 and the RF processing unit 910 and connects to a base station. In addition, the control unit 940 includes the connection excluding control unit 912. For example, the connection excluding control unit 912 controls the apparatus for managing the connection to the mobile base station to perform the procedures shown in FIGS. 1, 3, 4, 5, 6, 7, and 8. The control unit 940 performs the following operations according to an embodiment of the present disclosure.

The control unit 940 selects a base station to be excluded from connection. When a connection canceling ratio or a disconnection time is greater than or equal to a threshold value or the terminal is situated in a set region, the control unit 940 determines whether to select a connection candidate base station or not. When the connection candidate base station is to be selected, the control unit 940 stores information on neighboring base stations, and selects a specific base station from the neighboring base stations to select the base station to be excluded from connection. When the specific base station has been detected during an initial base station observing time but has not been detected during an appearing/disappearing determination reference time, the specific base station is selected as the base station to be excluded from connection.

The control unit 940 releases the specific base station from the base station to be excluded from connection. To release the specific base station from the base station to be excluded from connection, the control unit 940 selects the specific base station selected as the base station to be excluded from connection, and, when the selected specific base station is detected during a connection stability determination reference time, the control unit 940 releases the specific base station from the base station to be excluded from connection.

The control unit 940 detects mobility of the terminal. When the mobility of the terminal is detected, the control unit 940 initializes the information on the base station to be excluded from connection.

Methods based on the various embodiments disclosed in the claims and/or specification of the present disclosure can be implemented in hardware, software, or a combination of both.

When implemented in software, a computer readable recording medium for storing one or more programs (i.e., software modules) can be provided. The one or more programs stored in the computer readable recording medium are configured for execution performed by one or more processors in an electronic device. The one or more programs include instructions for allowing the electronic device to execute the methods based on the various embodiments disclosed in the claims and/or specification of the present disclosure.

The program (i.e., the software module or software) can be stored in a random access memory, a non-volatile memory including a flash memory, a Read Only Memory (ROM), an Electrically Erasable Programmable ROM (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory may be plural in number.

Further, the program can be stored in an attachable storage device capable of accessing the electronic device through a communication network such as the Internet, an Intranet, a LAN, a Wide LAN (WLAN), or a Storage Area Network (SAN) or a communication network configured by combining the networks. The storage device can access via an external port to the electronic device performing the various embodiments of the present disclosure. In addition, a separate storage device on a communication network may access the apparatus performing the various embodiment of the present disclosure.

In the above-described embodiments, the elements included in the present disclosure are expressed in a singular form or a plural form according to an embodiment. However, the singular form or plural form is only selected to correspond to a situation suggested for convenience of explanation and the present disclosure is not limited to a single element or a plurality of elements, and the elements expressed in the plural form may be configured as a single element or the element expressed in the singular form may be configured as plural elements.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus for connecting to a wireless communication system, the apparatus comprising:
    at least one processor configured to:
        detect base stations by performing a base station search for a first period, wherein a signal strength of each of signals received from the base stations within the first period is greater than or equal to a threshold value,
        identify at least one base station, among the detected base stations, wherein a signal strength of a signal received from the at least one base station stays lower than the threshold value for a second period that begins after a start of the first period and ends before the first period, and
        determine whether the second period exceeds a threshold period or is below the threshold period; and
    a transceiver configured to transmit, to a base station different from the at least one base station among the base stations, a message for requesting to access the base station in response to determining that the second period exceeds the threshold period.

2. The apparatus of claim 1, wherein, when at least one of a number of canceled connection or a disconnected time of the apparatus during a determined period is greater than or equal to a threshold value, the at least one processor is configured to identify the at least one base station among the base stations.

3. The apparatus of claim 1, wherein the at least one processor is configured to:
    search at least one of mobility information or location information of the apparatus, and
    when the apparatus is situated in a region in which a base station having lower connection stability of the apparatus than a threshold value exists, identify the at least one base station among the base stations.

4. The apparatus of claim 1, wherein the at least one processor is configured to add, to a base station group to be excluded from connection, a base station which is determined to repeat appearing and disappearing according to determining that the second period exceeds the threshold period.

5. The apparatus of claim 4, wherein, when a signal strength of a signal received from a specific base station within the first period is greater or equal to the threshold value and stays lower than the threshold value for the second period, the at least one processor is configured to:
    determine that the specific base station is a base station repeating appearing and disappearing, and
    add the specific base station to the base station group.

6. The apparatus of claim 1, wherein, when a searching period is longer than the second period, the at least one processor is configured to change the searching period.

7. The apparatus of claim 4, wherein the at least one processor is configured to release a base station detected in a third period from among the base station group.

8. The apparatus of claim 4, wherein, when a base station is continuously detected during a third period, the at least one processor is configured to release the base station continuously detected during the third period from among the base station group.

9. The apparatus of claim 4, wherein, when the apparatus moves to a different location, the at least one processor is configured to initialize the base station group.

10. The apparatus of claim 1, wherein the second period is determined based on a received signal strength indicator (RSSI) signal pattern of a base station.

11. The apparatus of claim 7, wherein the third period is determined based on a received signal strength indicator (RSSI) signal pattern of a base station.

12. The apparatus of claim 1, wherein the transceiver is further configured to:
    receive a connection response signal from the base station, and
    connect to the base station.

13. A method of an apparatus for connecting to a wireless communication system, the method comprising:
    detecting base stations by performing a base station search for a first period, wherein a signal strength of each of signals received from the base stations within the first period is greater than or equal to a threshold value;
    identifying at least one base station among the detected base stations, wherein a signal strength of a signal received from the at least one base station stays lower than the threshold value for a second period that begins after a start of the first period and ends before the first period;
    determining whether the second period exceeds a threshold period or is below the threshold period; and
    transmitting, to a base station different from the at least one base station among the base stations, a message for requesting to access the base station in response to determining that the second period exceeds the threshold period.

14. The method of claim 13, wherein the identifying of the at least one base station comprises:
    when at least one of a number of canceled connection or a disconnected time of the apparatus during a determined period is greater than or equal to a threshold value, identifying the at least one base station among the base stations.

15. The method of claim 13, wherein the identifying of the at least one base station comprises:
    searching at least one of mobility information or location information of the apparatus, and
    when the apparatus is situated in a region in which a base station having lower connection stability of the apparatus than a threshold value exists, identifying the at least one base station among the base stations.

16. The method of claim 13, further comprising:
    adding, to a base station group to be excluded from connection, a base station which is determined to repeat appearing and disappearing according to determining that the second period exceeds the threshold period.

17. The method of claim 16, further comprising:

when a signal strength of a signal received from a specific base station within the first period is greater or equal to the threshold value and stays lower than the threshold value for the second period, determining that the specific base station is a base station repeating appearing and disappearing; and adding the specific base station to the base station group.

18. The method of claim 13, further comprising:

when a searching period is longer than the second period, changing the searching period.

19. The method of claim 16, further comprising:

releasing a base station detected in a third period from among the base station group.

20. The method of claim 16, further comprising:

when a base station is continuously detected during a third period, releasing the base station continuously detected during the third period from among the base station group.

21. The method of claim 16, further comprising:

when the apparatus moves to a different location, initializing the base station group.

22. The method of claim 13, wherein the second period is determined based on a received signal strength indicator (RSSI) signal pattern of a base station.

23. The method of claim 19, wherein the third period is determined based on a received signal strength indicator (RSSI) signal pattern of a base station.

24. The method of claim 13, further comprising:

receiving a connection response signal from the base station, and connecting to the base station.

* * * * *